Dec. 9, 1941.  A. REDLER  2,265,672
CONVEYER
Filed July 20, 1938
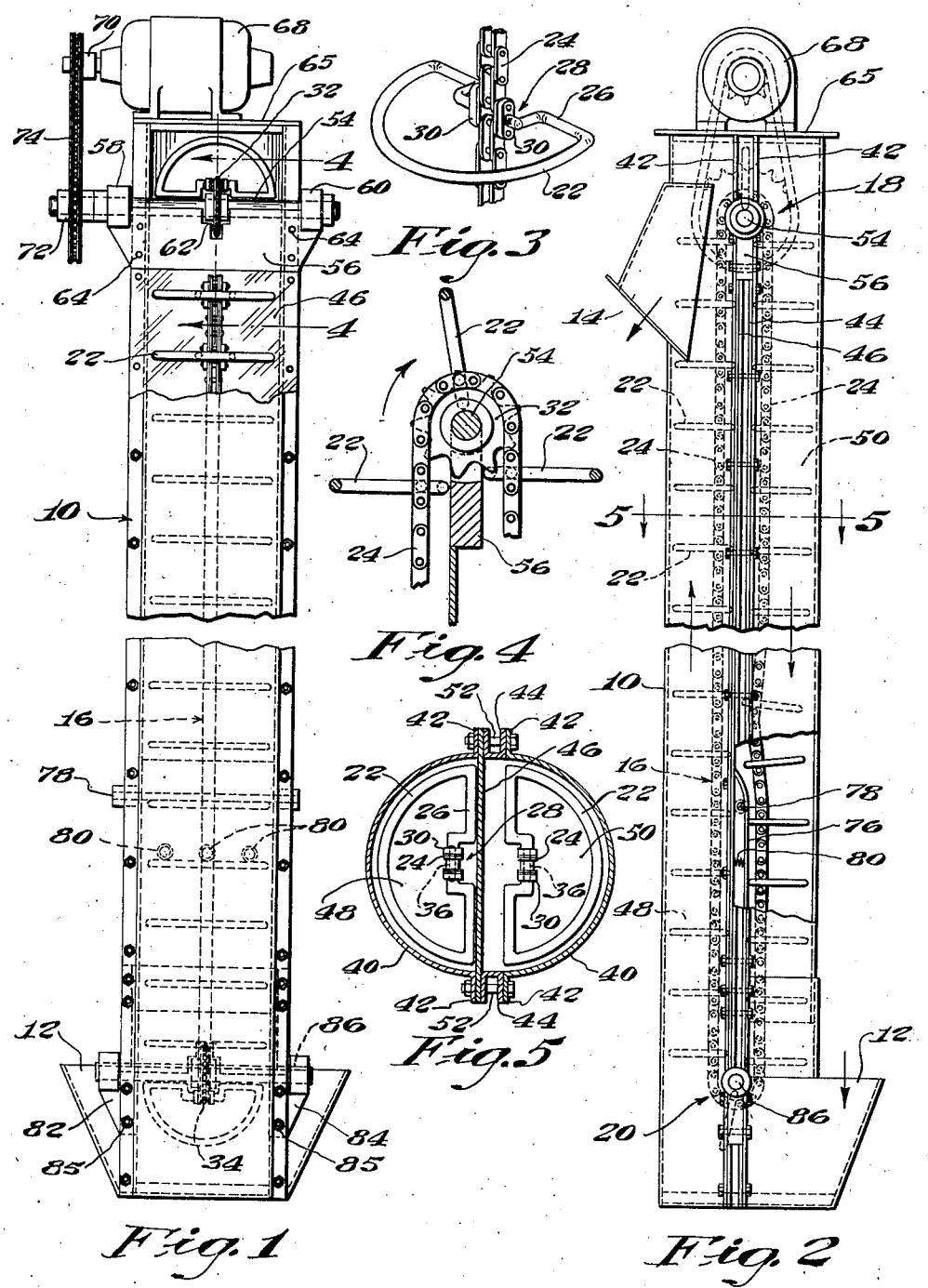
INVENTOR
Arnold Redler
BY
J. Stanley Churchill.
ATTORNEY Patented Dec. 9, 1941

2,265,672

UNITED STATES PATENT OFFICE 2,265,672

CONVEYER

Arnold Redler, Stroud, England, assignor to Redler Conveyor Company, Quincy, Mass., a corporation of Massachusetts Application July 20, 1938, Serial No. 220,227
In Great Britain April 11, 1937

3 Claims. (Cl. 198—176)

This invention relates to a conveyer.

One object of the invention is to provide a novel and highly efficient conveyer of the type provided with a casing or trough and a conveying element adapted to be drawn therethrough, which may be economically manufactured, easily repaired and is positive in operation.

A further object of the invention is to provide a novel and improved conveyer of the type embodying a trough or casing through which flowable solid material may be conveyed in a continuous stream and whose construction is such as to facilitate the driving of the endless conveying element by which the material is conveyed through the casing.

With these general objects in view and such others as may hereinafter appear, the invention consists in the conveyer and in the various structures, arrangements and combinations of parts hereinafter described and particularly defined in the claims at the end of this specification.

In the drawing illustrating the preferred embodiment of the invention, Fig. 1 is a front elevation of a conveyer embodying the invention with a portion broken away; Fig. 2 is a side elevation of the conveyer shown in Fig. 1; Fig. 3 is a perspective view of a portion of the conveying element; Fig. 4 is an enlarged detail view in cross-section, taken on the line 4—4 of Fig. 1; and Fig. 5 is an enlarged cross-sectional view taken on the line 5—5 of Fig. 2.

Prior to the present invention, it has been proposed to convey flowable solid material through a casing by a conveying element made up of a series of chain-like or skeleton flights connected together and difficulty has been experienced in causing such a skeleton chain-like structure to pass over the driving sprocket requiring specially designed driving sprockets and in most instances enlargements in the casing to permit the chain to pass over the sprocket. Other proposals have included the so-called cable type of skeleton conveyer illustrated in the patent of Redler No. 1,910,056. Difficulty has been experienced, however, in this latter type of conveyer by reason of the continuity of the cable and inconvenience in repairing portions thereof, the difficulty in controlling the elongation of the cable and in other practical details.

The present invention seeks to combine the advantages of the cable type of conveyer and those of the chain type of conveyer and to improve upon the operation, the driving of the conveying element and the ease of replacement of parts and flights and to this end the invention contemplates a conveyer having a casing and a conveying element made up of a relatively narrow and closely articulated chain disposed more or less centrally in the casing to be spaced from the walls thereof and arranged to pass over terminal sprockets of standard structure. The relatively narrow chain is provided with a series of spaced transversely extended flights which may take various forms and may be open, semisolid or solid, depending on the particular purposes for which the conveyer is to be used. For purposes of illustration an open flight conveyer has been herein shown. The flights are arranged to extend a substantial distance laterally beyond each side of the driving chain and to cooperate with the walls of the casing to efficiently convey the material therethrough.

In general, the present invention contemplates a conveyer comprising a casing provided with an inlet and an outlet, and a conveying element having a plurality of transversely extended flights, arranged to be drawn through the casing to effect the conveyance therethrough of the material to be conveyed. The conveying element may and preferably will be provided with a plurality of transversely extended open flights and may be arranged to be drawn through the conveyer by driving means including one or more rotary elements over which the conveying element is caused to pass. In the past, the construction of the conveying element has been such as to necessitate a relatively large driving terminal. Inasmuch as the driving element in the form of a sprocket was arranged to contact with each individual flight as it passed thereover, the pitch of the driving sprocket and consequently the diameter thereof was more or less determined by the distance apart of the flight. As a result of this construction it was sometimes necessary to enlarge the casing at the terminal ends to permit the flights sufficient clearance while passing over the terminals. One feature of the present invention contemplates the provision of a conveying element adapted to pass over a terminal of substantially reduced dimensions so that the necessity for enlarging the terminal end of the conveyer is eliminated and the body of the casing may be of uniform cross-section throughout its entire length. One of the benefits flowing from the present construction of conveyer resides in the ability to maintain a standard size of driving element regardless of the spacing of the individual flights of the conveying element and also, the pitch of the conveying element, that is, the distance between the flights may be changed without changing the size of the driving element. Thus, the present conveyer may be adapted to serve for the conveyance of different materials requiring changes in the conveying element without disturbing the driving element or requiring a change in the casing whereby the conveyer lends itself to standardized construction and economical manufacture.

Referring now to the drawing, the conveyer, illustrated therein, comprises a conveyer of the type forming the subject matter of the Redler Reissue Patent No. 18,445, issued April 26, 1932, which is characterized by its ability to convey the flowable solid material in a continuous stream. The different features of the invention have, for purposes of illustration, been herein shown as embodied in a conveyer of the elevator type and as herein shown, 10 represents a casing or conduit provided with an inlet 12 through which the material to be conveyed is introduced and an outlet 14 through which the material is discharged. A conveying element, indicated generally at 16, is arranged to be drawn through the casing 10 to effect withdrawal of the material therethrough. The conveying element 16 is arranged to pass over terminals 18, 20 disposed at the ends of the conveyer.

In accordance with the present invention, the conveying element 16 of the present conveyer comprises a plurality of spaced open flights 22, of general D-shape, attached to an endless roller chain 24 at intervals along the length thereof. As illustrated in detail in Fig. 3, the straight side 26 of each flight is recessed as at 28 and the ends of the flight are provided with connecting pads 30 adapted to be attached to either side of the roller chain 24. The roller chain being of relatively small pitch is adapted to pass over relatively small sprockets 32, 34 disposed at either end of the conveyer. In operation, the flights attached to the chain extend transversely to the direction of movement of the conveying element and preferably the attachment of the flights is such that a more or less equal path is swept by each flight on either side of the chain. In other words there is a substantially equal area of flight on either side of the chain pivots 36 tending to maintain an equal balance as the flights operate in the material being conveyed.

As a result of the provision of the novel conveying element capable of passing over terminals of substantially reduced dimensions, the casing 10 through which the material is conveyed may be constructed of uniform cross-section throughout its entire length. As herein illustrated, see Fig. 5, the preferred form of the casing comprises two substantially identical half sections 40 provided with flanges 42 along their longitudinal edges. Spacers in the form of structural members 44 are inserted between the flanges and the structure is divided by a transverse partition member 46 separating one run of the conveyer from the other. The partition 46 divides the interior of the structure into two sections, not quite symmetrical, the smaller section 48 comprising the working run of the conveyer and the larger section 50 comprising the idle or return run. The structure is held together by bolts 52 which extend through the flanges 42 retaining the spacers and the partition therebetween.

The driving terminal 18, as herein illustrated, comprises a unitary structure adapted to be supported by the casing between the flanges of the opposite walls of the casing. As herein shown, the sprocket 32 is fast upon a shaft 54 which is supported in a bracket 56 which extends through the casing and is provided with end bearings 58, 60. The bearings extend beyond the casing on either side, the portion of the bracket within the casing being of a width to fit between the flanges 42 of the casing. The upper portion of the bracket is arcuately grooved to receive the shaft 54. In the construction of the conveyer the spacers 44 and the partitioning member 46 terminate a substantial distance from the top of the conveyer, leaving slots between the flanges between which the bracket 56 is received. The bracket is slotted at 62 to clear the sprocket 32. When the unit is dropped into position from the top of the casing, when assembling, it may be bolted to the flanges 42 by bolts 64. The top end of the casing may be closed by a cap 65 and the open portions between the flanges may be filled in by suitable spacers. The rigid construction of the casing permits the top of the conveyer to be used to support a motor 68 which drives the shaft 54 through the sprockets 70, 72 and chain 74.

In operation, the portion of the conveying element 16 extending through the return run 50 will be the slack side and in order to guide the element over the lower terminal 20 and to maintain the proper tension a part of the wall of the return leg may comprise a tensioning element 76 herein shown pivotally connected at 78 and arranged to bear against the edges of the flights as they pass. Coil springs 80 are provided between the partition member 46 and the tensioning element 76 in order to constrain the conveying element in a definite path to the point where it meets the lower terminal 20. As illustrated herein, the lower terminal 20 may and preferably will comprise bearing members 82, 84 supported between the flanges 42 of the casing and attached thereto by the bolts 85. The idle sprocket 34 is fast upon the cross-shaft 86 supported in the bearings. It will be observed that the terminal shafts 54 and 86 are of a diameter substantially equal to the width of the space between the flanges 42.

From the above description it will be apparent that the present construction of conveyer combines the desirable features of a cable type and a chain type of conveyer of the prior art without detracting from the operating efficiency of either type.

While the preferred embodiment of the invention has been herein illustrated and described, it will be understood that the invention may be embodied in other forms within the scope of the following claims.

Having thus described the invention, what is claimed is:

1. In a conveyer for conveying flowable solid material in a continuous stream comprising a casing having an inlet and an outlet, an endless conveying element traversable through the casing to effect the conveyance of the material therethrough, said conveying element comprising a relatively narrow and closely articulated chain of relatively small pitch, a pair of sprockets over which said chain passes, said endless chain being provided with a series of spaced, transversely extended flights of open structure of semi-circular shape, the ends of the semi-circular portions being extended inwardly and connected to opposing links of said chain, the distance between said spaced flights being several times greater than said chain pitch.

2. A conveyer for conveying flowable solid material in a continuous stream comprising a casing, an endless conveying element comprising a relatively narrow roller chain of relatively small pitch having closely articulated and pivotally connected links, a pair of sprockets having teeth corresponding to said chain pitch and over which the chain passes, said chain being provided with a series of spaced transversely extended flights of open structure, each of said flights having a straight side interrupted to provide spaced ends terminating in pads, said pads being spaced to receive said chain therebetween and to be attached thereto by two adjacent pivots of said chain so that said chain is disposed substantially medially of the ends of said side, the distance between said spaced flights being substantially greater than the pitch of said chain.

3. A conveyer for conveying flowable solid material in a continuous stream comprising a casing having a transverse partition wall, an endless conveying element traversable through the casing comprising a relatively narrow roller chain of relatively small pitch, a pair of sprockets over which said chain passes, said conveying element being provided with a series of spaced transversely extended flights of open structure, each of said flights having a straight side interrupted substantially midway of its length to provide spaced ends, said ends being connected to said chain so that said chain is disposed substantially medially of said straight side, the distance between said spaced flights being several times greater than the pitch of said chain, said sprockets being of relatively small diameter and mounted upon end portions of said partitioning wall whereby the chain is enabled to run in close proximity to said partitioning wall.

ARNOLD REDLER.